United States Patent [19]

Franaszek

[11] Patent Number: 4,984,237
[45] Date of Patent: Jan. 8, 1991

[54] MULTISTAGE NETWORK WITH DISTRIBUTED PIPELINED CONTROL

[75] Inventor: Peter A. Franaszek, Katonah, N.Y.

[73] Assignee: International Business Machines Corporation, Armonk, N.Y.

[21] Appl. No.: 373,860

[22] Filed: Jun. 29, 1989

[51] Int. Cl.$^5$ .............................................. H04Q 11/04
[52] U.S. Cl. ........................................ 370/60; 370/54; 370/94.1
[58] Field of Search .................... 370/58.1, 58.2, 58.3, 370/60, 65.5, 94.1, 54; 340/825.79, 825.80

[56] References Cited

U.S. PATENT DOCUMENTS

| | | | |
|---|---|---|---|
| 4,605,928 | 8/1986 | Georgoiu | 340/825.94 |
| 4,625,306 | 11/1986 | Newman | 370/60 |
| 4,630,045 | 12/1986 | Georgiou | 340/825.79 |
| 4,663,620 | 5/1987 | Paul et al. | 340/825.79 |
| 4,814,762 | 3/1989 | Franaszek | 340/825.79 |

Primary Examiner—Douglas W. Olms
Assistant Examiner—Christopher O. Edwards
Attorney, Agent, or Firm—Whitham & Marhoefer

[57] ABSTRACT

A multistage network having a combination of low latency and probability of blockage has particular application in the interconnection of parallel computers. A technique minimizes the blockage of the multistage network, thereby minimizing the number of times that a message requires retransmission. The technique also permits higher utilization of data transport paths in the multistage network. The network has no buffers, so a message either succeeds in getting through, or, if blocked, leads to the notification of the originator that transmission was unsuccessful and that another attempt is required. Multiple return paths, used for example in a time-division-multiplexed (TDM) fashion, are provided in the network. This substantially reduces the amount of blocking in the network, and thus the number of times that a message requires retransmission. In addition, networks associated with the backward paths are used as a means of controlling the data transport. This permits the data transport function to be substantially simplified. It also permits higher utilization of the data transport paths, as the control function can be pipelined.

9 Claims, 4 Drawing Sheets

MULTISTAGE NETWORK WITH DISTRIBUTED PIPELINED CONTROL

BACKGROUND OF THE INVENTION

1. Field of the Invention

The present invention generally relates to multiplex interconnection networks for communication systems, and especially digital communication systems for parallel computers, and, more particularly, to a network which provides a combination of low latency and probability of blockage.

2. Description of the Prior Art

High performance, multi-processor computer systems are characterized by multiple central processor units (CPUs) operating independently, but occasionally communicating with one another or with memory devices when data needs to be exchanged. The CPUs and the memory devices have input/output (I/O) ports which must be selectively connected to exchange data. The data exchanges occur frequently but at random times and occur between random combinations of CPUs and memory devices. Therefore, some kind of switching network is required to connect the ports for the relatively short period of the data exchange. This switching network must provide a high bandwidth so that the processing is not unduly delayed while the data is being exchanged. Furthermore, the connections are frequently made and broken, and delays that occur while waiting for a connection or delays incurred while the connection is being made can also impact the total capability of the parallel CPUs.

FIG. 1 is an illustration of one type of computer system to which the subject invention is directed. There are a large number of CPUs 10, each operating independently and in parallel with each other. In the past, it has been common to have the number N of parallel CPUs to be in the neighborhood of four. However, newer designs involve greater numbers N of CPUs of 256 ($2^8$) to 1,024 ($2^{10}$), or even greater. Each of the CPUs 10 occasionally requires access to one of the several memory devices 12. For the sake of illustration, the memory devices will be assumed to be equivalent and also of number N. Each CPU 10 has an I/O path 14 and each memory device 12 has an I/O path 16. The paths 14 and 16 can be buses and may be duplicated to provide full-duplex communication. The important consideration, however, is that a CPU 10, requiring access to a particular memory device 12, have its I/O path 14 connected to the I/O path 16 of the required memory device 12. This selective connection is performed by a switching network 18, which is central to the design for the distributed processing of the computer system illustrated in FIG. 1.

The use of a cross-point switch for the switching network 18 provides the required high bandwidth. The important feature of a cross-point switch is that it can simultaneously provide N connections from one side to the other, each selectively made. Although the complexity of a cross-point switch increases in proportion to $N^2$, the relative simplicity of the actual $N^2$ cross-points allows its fabrication in a currently available technology.

Christos J. Georgiou has described in U.S. Pat. No. 4,605,928 a cross-point switch composed of an array of smaller cross-point switches, each on a separate integrated circuit (IC). Although Georgiou describes a single-sided switch, as opposed to the double-sided switch of FIG. 1, Georgiou's switch can be used in the configuration of FIG. 1, or easily adapted thereto. With the cross-point switch of Georgiou, it is easily conceivable that the number N of ports to the switch can be increased to 1,024. Thus, the total bandwidth of the switch 18 would be 1,024 times the bandwidth of the transmission paths 14 and 16. The cross-point switch of Georgiou has the further advantage of being non-blocking. By non-blocking what is meant is that if a CPU 10 requires that its I/O path 14 be connected to the I/O path 16 of a memory 12 not currently connected, the switch 18 can provide that connection. Thus, a CPU 10 is not blocked by the switch 18 when it requires a connection to a memory device 12.

Georgiou has also described, in U.S. Pat. No. 4,630,045, a controller for his cross-point switch. Georgiou's controller is designed to be very fast but it suffers from the deficiency of most cross-point switches that one controller is used for all N input ports. As a result, the controller must sequentially service multiple ports requesting connection through the cross-point switch. Therefore, once the demanded connection rate exceeds the speed of the controller, the controller becomes a bottleneck. This is because the controller is a shared resource. Even if the controller of Georgiou were redesigned to provide parallel subcontrollers, perhaps attached to each port, then a mechanism or network would have to be introduced to transmit to each such controller the collection of appropriate connection requests. These controllers and the associated networks introduce substantial complexity and delay as described in "Path Hierarchies in Interconnection Networks" by Peter A. Franaszek, *IBM J. Res. and Develop.*, vol. 31, no. 1, January 1987, pp. 120–131.

An alternative to the cross-point switch is the Delta network. Delta networks are defined, with several examples, by Dias et al. in an article entitled "Analysis and Simulation of Buffered Delta Networks", *IEEE Transactions on Computers*, vol. C-30, no. 4, April 1981, pp. 273–282. Patel also defines a Delta network in "Performance of Processor-Memory Interconnections for Multiprocessors", *IEEE Transactions on Computers*, vol. C-30, no. 10, October 1981, pp. 771–780. An example of a Delta network for packet switching is described by Szurkowski in an article entitled "The Use of Multi-Stage Switching Networks in the Design of Local Network Packet Switching", 1981 *International Conference on Communications*, Denver, Colo. (June 14–18, 1981). The Delta network will be described here with reference to the Omega switching network, described by Gottlieb et al. in an article entitled "The NYU Ultracomputer—Designing an MIMD Shared Memory Parallel Computer", *IEEE Transactions on Computers*, vol. C-32, no. 2, February 1983, pp. 175–189. This example is illustrated in FIG. 2.

In FIG. 2, there are eight ports on the left, identified by binary numbers, and eight ports on the right, similarly identified by binary numbers. Connecting the right hand and the left hand ports are three stages of switches 20. Each switch 20 is a 2×2 switch that can selectively connect one of the two inputs on one side to one of the two outputs on the other side. The illustrated Delta network can provide a connection from any port on the right hand side to any port on the left hand side. Data is transmitted from one side to another in relatively small packets containing, in addition to the data, control information, including the address of the desired destination. By use of buffers within the switches 20, it is possible to decouple the switches of the different sections so that the control and transmission are pipelined between the stages of the 2×2 switches 20. Thus, the control function of the Delta network is potentially very fast and the delay introduced by the stages rises as a function of logN.

One of the principal goals in the design of an interconnection network for parallel computers is to minimize latency; that is, the time required to traverse the network. In a multi-stage network such as the delta network discussed above, the actual delay is in general a function of the operations to be performed at each stage. Thus, one approach to reducing latency in such networks is to minimize the complexity of the operations to be performed at each stage or intermediate node. For example, if the network has no buffers, then the circuitry associated with buffers and buffer handling at each node is eliminated. This reduces the number of gate delays per stage. Likewise, since the number of logic elements per stage is reduced, more nodes or stages can be placed on a single chip, thus reducing the number of chip crossing delays.

Networks without buffers may be combined with more complex networks into a path hierarchy; that is, the highest level is a bufferless network, followed by a buffered network, and so on. The basic idea of such a hierarchy is that the highest speed connection is made through the bufferless network, but when a collision occurs, the buffered network may be used to increase the chances of the connection being made.

The usual design of bufferless networks is such that there is a single backward link between any two nodes in the network. The effect is that if a message $M_{ij}$ has traversed a sequence of nodes $N_1, N_2, \ldots, N_r$, then no other message can use the links between any two of these nodes until message $M_{ij}$ releases this path, either as a result of reaching its destination or due to the message being blocked. A consequence is that the probability of blocking can be high. That is, there may often not be a desired path available through the network because the backward link between two nodes is not available, even though the forward link is.

SUMMARY OF THE INVENTION

It is therefore an object of the present invention to provide in a multistage bufferless network a combination of low latency and probability of blockage.

It is another object of the invention to provide a technique for minimizing the blockage of a bufferless multistage network, thereby minimizing the number of times that a message requires retransmission.

It is a further object of the invention to provide a technique which permits higher utilization of data transport paths in a bufferless multistage network.

Since the network according to the invention has no buffers, a message either succeeds in getting through, or, if blocked, it must lead to the notification of the originator that transmission was unsuccessful and that another attempt is required. In other words, for each message in the network, there must be a reserved path to its origin which can be used to signal the need for retransmission. The invention provides multiple return paths used, for example, in a time-division-multiplexed (TDM) fashion. This substantially reduces the amount of blocking in the network, and thus the number of times that a message requires retransmission. In addition, the invention uses the networks which provide the backward paths as a means of controlling the data transport. This permits the data transport function to be substantially simplified. It also permits higher utilization of the data transport paths, as the control function can be pipelined.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
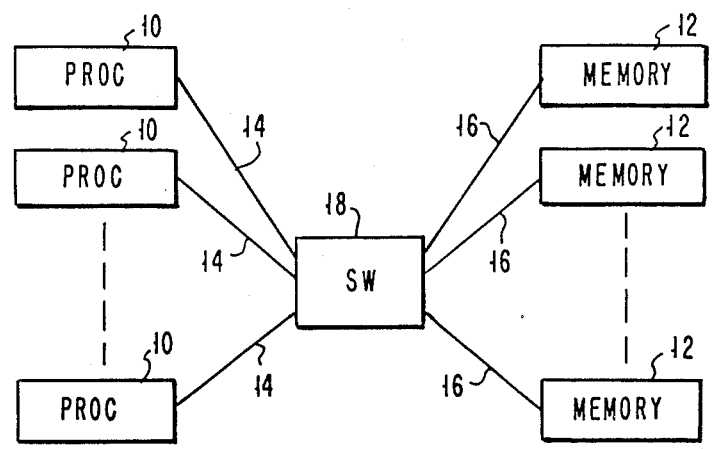
FIG. 1 is a block diagram illustrating a generalized multi-port switching system.
Figure 2:
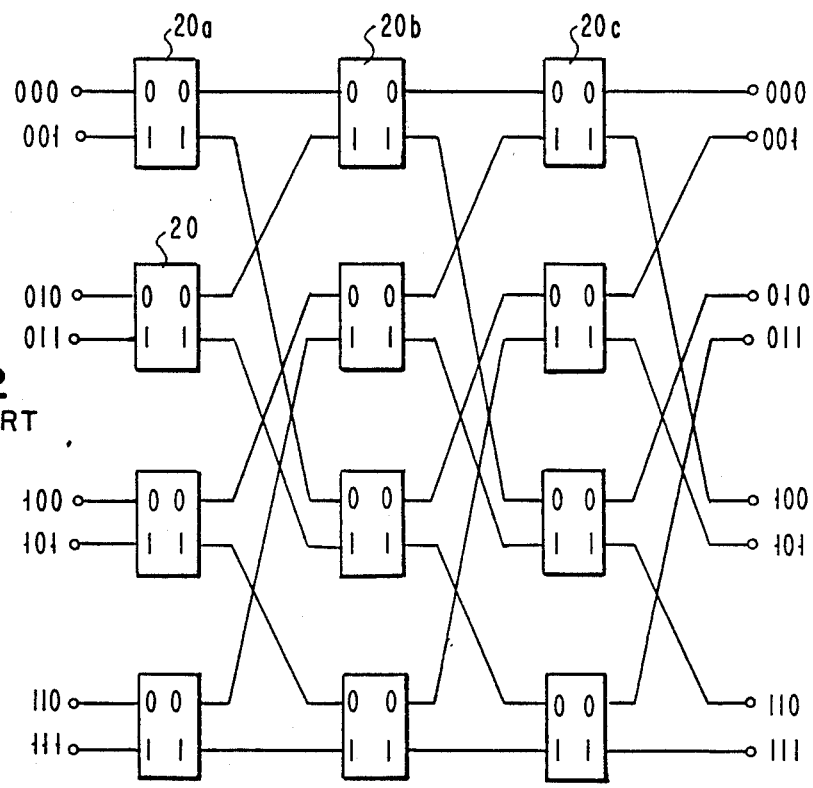
FIG. 2 is a schematic illustration of a conventional Delta network.
Figure 3:
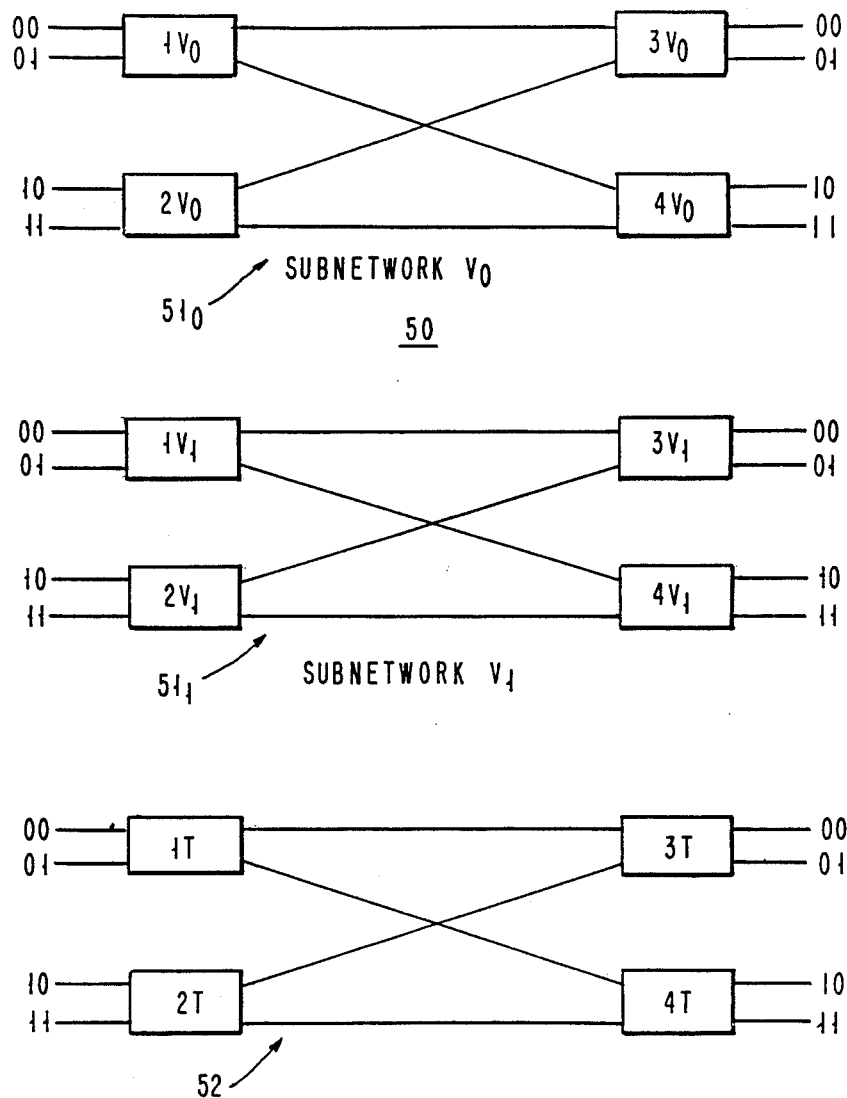
FIG. 3 is a block diagram showing a network according to the present invention comprising two subnetworks, one for data transport and the other for control functions.

Referring now to the drawings, and more particularly to FIG. 3, there is shown a multistage network according to the present invention. The network may be viewed as consisting of two networks, a control network 50 and a transport network 52. The control network 50 is in turn composed of two subnetworks $51_0$ and $51_1$, and each of the several networks have the same topology. The networks described are topologically standard delta or omega multistage networks. The concepts of the invention are concerned with the structure and function of the nodes as well as the operation of their interconnecting links.

Considering first the control network 50, this can consist of Q separate delta or omega networks (with D×D nodes) $V_0, V_1, V_3, \ldots, V_{Q-1}$, each configured with a backward path corresponding to each forward path. The notion here is that time is divided into slots of duration T, with packets transmitted in the $n^{th}$ slot controlled by the network $V_i$, where $i=(n)$ modulo Q. If transmission of a packet occupies an intermediate data transport node for duration T, then two packets can collide (i.e., one block the other) only if they are transmitted in the same cycle modulo Q. This is because each such cycle is associated with its own backward path.

For simplicity, FIG. 3 illustrates a network in which four processors can be connected to four memories. The subnetworks $51_0$ and $51_1$ are denoted as networks $V_0$ and $V_1$. Nodes $jV_0$ to $jV_0$, $j=1, 2, 3, 4$, correspond to and control node jT in the transport network 52.

The data transport network 52 according to this implementation has data paths sufficiently wide so that an entire packet could traverse a node in time T. That is, a node is capable of transmitting a packet every T seconds. In practice, this typically means that a single transport node would be comprised of multiple chips, each providing a portion of the data path.

It is advantageous to have the transport function as simple as possible. Each chip in the data transport network could, for example, comprise a D×D self-routing crossbar (with each of the D input and output paths of width W), with D enable lines. Here contention resolution on the $r^{th}$ cycle would be done by the appropriate control network, with the result that the appropriate enable lines would be energized.

Figure 4:
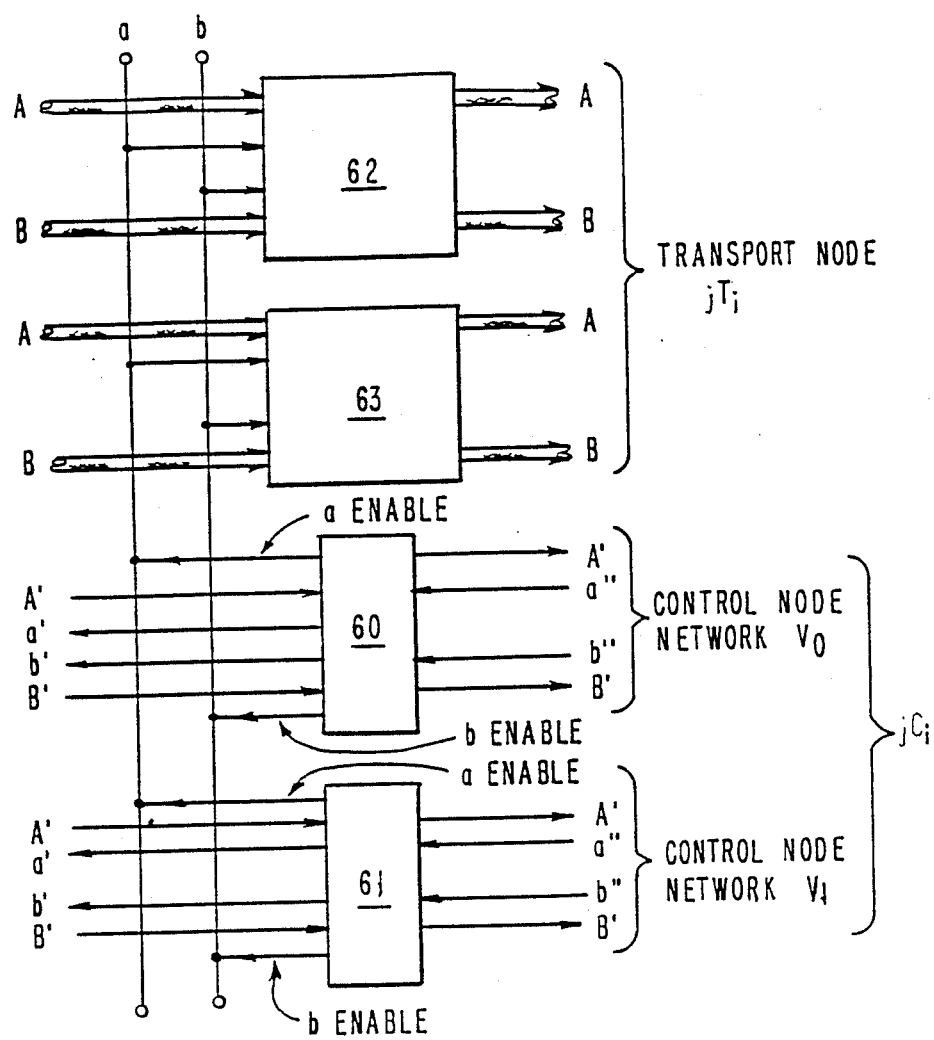
FIG. 4 is a block diagram showing a node in the multistage network according to the invention.

FIG. 4 shows a combined node in such a network, where D=2. For each transport node in the network 52, there are two control nodes, here represented by control nodes 60 and 61, in the network 50. The data network transport node is, in the illustrated example, comprised of two chips 62 and 63. Each of these chips may be a two-by-two crossbar of conventional design. In a practical embodiment, eight-by-eight crossbar chips may be used, but the example shown will be easier to understand and best illustrates the principles of operation of the invention.

The operation is as follows. Suppose a packet is about to be received on input line A to be transmitted in an even time slot associated with control subnetwork $V_0$. The control node 60 would then determine whether the desired forwarding line was free during the appropriate time slot. If the answer is no, it would enable the a' line, indicating that there is a collision and that retransmission is required. This has the effect of raising the appropriate feedback disable line (e.g., a'') on the preceding node, resulting in the propagation of the disable signal and the disconnection of this path in this ($V_0$) control network.

Suppose on the other hand that there is no collision. Then the control message is propagated to the next node, and enable line a is raised. The enable line a enables the transport path for input line A of chips 62 and 63. The effect is that each transport crossbar can determine which data packets can be forwarded. In either case, while control network $V_0$ is controlling transmissions on an even time slot, the control network $V_1$ is preparing to enable transmissions on the next, odd time slot, thus pipelining the control function.

Figure 5:
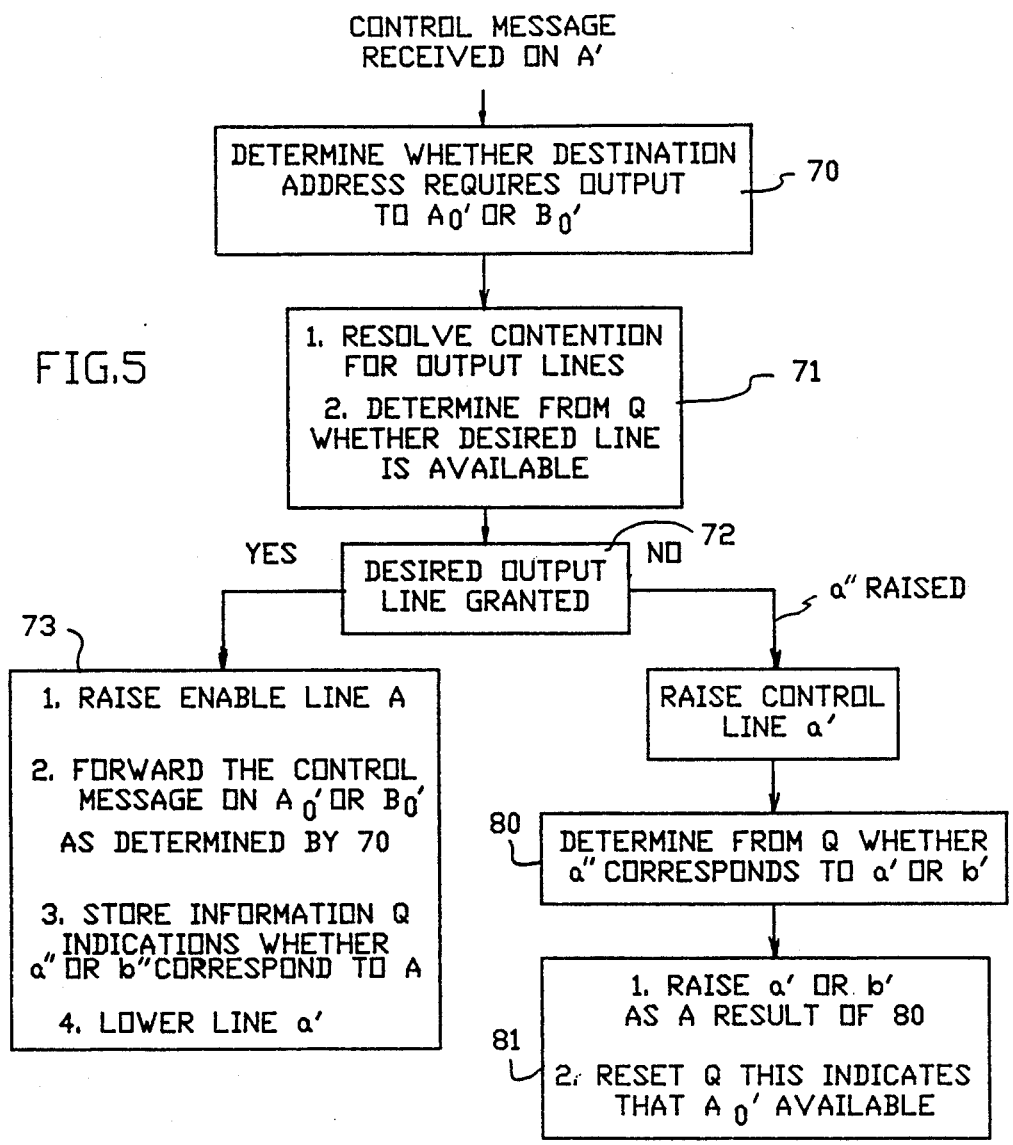
FIG. 5 is a flow diagram illustrating the logical operation of a control node shown in FIG. 4.

FIG. 5 illustrates in more detail the logical operation of the control node in FIG. 4. When a control message is received on line A', a determination is made in function block 70 as to whether the destination address requires an output to line $A_0'$ or line $B_0'$. Then in function block 71, a resolution of any contention for the output lines is made followed by a determination from Q whether the desired line is available. A test is made in decision block 72 to determine if the desired output line is available. If not, control line a' is raised; otherwise, in function block 73, enable line a is raised, the control message is forwarded on line $A_0'$ or line $B_0'$ (as determined in function block 70), information Q indicating whether a'' or b'' correspond to a is stored, and line a' is lowered.

If line a'' is raised, a determination is made in function block 80 from Q whether a'' corresponds to a' or b'. Then, depending on the result of the determination made in function block 80, a' or b' is raised and Q is reset in function block 81. This indicates that $A_0'$ is available. Raising the a'' line can occur, for example, due to either a collision or due to a message reaching its destination. These two alternatives can be differentiated at the originating processor by noting the delay since message transmission.

This time division multiplexing of the control function has the effect of doubling the number of backward paths in the bufferless multistage network, thereby decreasing the probability of a collision. That is, only message packets assigned to an even time slot will collide with similarly assigned message packets, and only message packets assigned to an odd time slot will collide with similarly assigned message packets.

The preferred embodiment showed two control subnetworks which are used depending on whether message transmission is initiated on an even or odd time slot. However, it should be understood that the basic notion of having multiple backward paths in a bufferless network applies equally well to a network where there is no such time division multiplexing. Here there would be a single control network, with each intermediate node having multiple backward paths to its predecessors. A given message, as transmitted, would be assigned an available backward path, and information would be kept at each intermediate node to indicate the correspondence between assigned backward paths entering and leaving each node. The effect would be to have multiple backward networks which are configured dynamically.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A multistage communication network with distributed pipeline control comprising:
    a first network comprising a first array of $N \times M$ nodes jT, j=1 to $N \times M$, said first array having a topology defining N input ports and M output ports, said output ports being connected to corresponding output buses and each of said input ports being selectively connectable to any one of said output buses via said output ports;
    each of said nodes jT comprising a transport node of one or more crossbar switches having input lines, output lines and at least one enable line, said input and output lines being connected to adjacent nodes in said first array;
    a second network comprising a plurality of subnetworks or arrays $V_i$, i=(n) modulo Q, said second subnetworks or arrays having $N \times M$ nodes $jC_i$, said second subnetworks or arrays having the same topology as said first network; and
    said nodes $Jc_i$ comprising at least two control nodes $V_0$ and $V_1$ connected to said enable line and controlling transmission of a packet of data through said nodes jT during at least two different time slots, said control nodes each having input and output disable lines and input and output control lines connected to adjacent nodes in said network, whereby a collision occurring in one of said nodes jT during one time slot will not affect a message packet at said node during another time slot.

2. The multistage communication network recited in claim 1 wherein said first network is a bufferless delta network.

3. The multistage communication network as recited in claim 2 wherein said input ports are connected to a plurality of processors and said output ports are connected to a plurality of memories.

4. In a multistage communication network comprising a bufferless delta transport network having a plurality of nodes, said network selectively connecting a plurality of originating input ports to a plurality of output ports, the improvement of the provision of multiple backward paths from each intermediate node in said delta network, said backward paths defining paths from a blocked node to an originating input port whereby blocking in said communication network is reduced due to the use of said multiple backward paths.

5. The multistage communication network as recited in claim 4 wherein said backward paths are established in a control network, said control network being a delta network of identical topology as said bufferless delta transport network.

6. The multistage communication network as recited in claim 5 wherein said transport network comprises a plurality of transport nodes and said control network comprises a plurality of control nodes, each of said control nodes being connected to a corresponding transport node to control the interconnection of nodes in said transport network.

7. The multistage communication network as recited in claim 6 wherein said originating input ports are connected to said output ports at different assigned time periods whereby originating input ports transmitting message packets at assigned time periods do not block originating input ports transmitting message packets at different assigned time periods.

8. A method of connecting a plurality of inputs to a plurality of outputs in a multistage communication network comprising the steps of:
providing a first bufferless transport network for making selective connections between said input and said outputs;
providing a second control network having a topology identical to said first network; and
establishing multiple backward paths between selective connections of said outputs and said inputs whereby blocking in said communication network is reduced due to said multiple backward paths.

9. The method recited in claim 8 further comprising the step of selectively connecting said inputs to said outputs on a time division multiplex basis whereby inputs transmitting message packets at assigned time periods do not block inputs transmitting message packets at different assigned time periods.

* * * * *